United States Patent [19]

Olding et al.

[11] 4,091,438
[45] May 23, 1978

[54] PRESS CONTROL SYSTEM

[75] Inventors: Michael J. Olding, Minster; Ronald F. Fortman, Fort Loramie; William J. Stewart, St. Mary's, all of Ohio

[73] Assignee: The Minster Machine Company, Minster, Ohio

[21] Appl. No.: 763,842

[22] Filed: Jan. 31, 1977

[51] Int. Cl.² .......................................... H01H 47/32
[52] U.S. Cl. ..................................... 361/189; 307/113
[58] Field of Search ........................ 361/189, 190, 88; 307/113, 125

[56] References Cited
U.S. PATENT DOCUMENTS 3,183,377  5/1965  Holland .......................... 361/189 X Primary Examiner—Harry E. Moose, Jr.
Attorney, Agent, or Firm—Albert L. Jeffers

[57] ABSTRACT

A press control system in which multiple pushbuttons are employed for initiating a press cycle with each pushbutton including a normally closed and a normally open blade and with each switch blade having connected in parallel therewith a monitoring circuit which produces logic signals in conformity with the position of the respective switch blade. A logic circuit analyzes the logic signals from the several monitoring circuits and permits operation of the press only when all of the switches operate properly during a press cycle.

12 Claims, 4 Drawing Figures

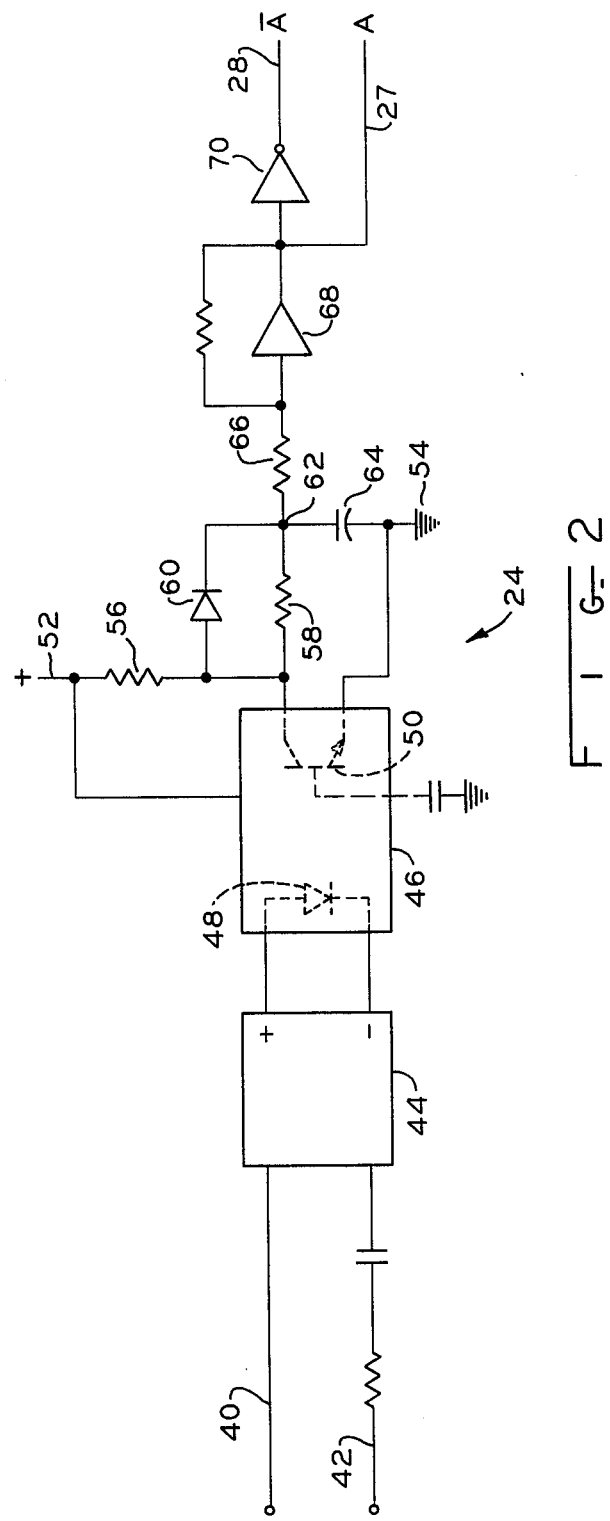

PRESS CONTROL SYSTEM

The present invention relates to press controls and is especially concerned with a press control in which switch blade positions are continuously monitored. Repeating of the press cycle is prevented in the event of any abnormality of switch operation.

Press control circuits for preventing improper press operation are, of course, well known, but there are occasions when control circuits will fail and a press cycle can be carried out under faulty conditions of one or more switches or the like in the control system.

Safety in respect of the operation of the presses and the like is absolutely essential and, accordingly, the present invention has been arrived at in order to provide a more sophisticated safety system which monitors the switches in the press control system and prevents operation of the press in the event of any abnormality in the operation of any of the switches.

BRIEF SUMMARY OF THE INVENTION

According to the present invention, the control circuit has a plurality of manual switches each having a normally open blade and a normally closed blade with the normally closed blade opening and the normally open blade closing when the respective switch is depressed.

The switches, of which there usually are twice as many as there are operators, so that each press operator must have both hands on a switch to initiate a press cycle, are connected in series and failure of any one of the switches to be depressed will prevent the initiation of a press cycle while failure of any one of the switches to return to its released position will prevent initiation of a new press cycle.

It is the case, however, that the switches can form in other ways, such as by a switch blade breaking off or becoming bent or twisted or otherwise failing individually to open and close on its respective contacts. The usual type of press control system will not always detect such abnormalities of switch operation and thus can be defective on certain occasions for preventing press operation under faulty conditions.

In the present invention, each switch blade has connected in parallel therewith a monitoring circuit which has two outputs, one of which will go high when the switch blade is separated from its contacts, and the other of which will go high when the switch blade is closed on its contacts.

In addition, a similar circuit is provided to monitor the energization of a clutch controlling solenoid and to monitor the energization of a cycle control relay embodied in the control circuit.

The output terminals of the monitoring circuits are interconnected by a gating circuit arrangement which will detect any abnormality in the operation of any of the switches of the control circuit and prevent the press from recycling in the event of such an abnormality.

The logic circuitry also includes further gates which, when no switch abnormality appears, will energize a "run" relay to prepare the press control circuit for a cycle.

All of the monitoring circuits involve rectifier means to convert a voltage thereacross to direct current, a light emitting diode which provides illumination when a voltage stands across the terminals of the respective monitoring circuit, a transistor sensitive to the illumination from the light emitting diode, and two output terminals connected in circuit with the transistor, one of the connections including an inverter so that under all conditions of the monitoring circuit is at logic high and the other is at logic low.

The exact nature of the present invention will become more clearly apparent upon reference to the following detailed specification taken in connection with the accompanying drawings in which:

FIG. 2 is a circuit diagram showing a typical monitoring circuit for incorporation in a press control circuit.

DETAILED DESCRIPTION OF THE INVENTION

Figure 1:
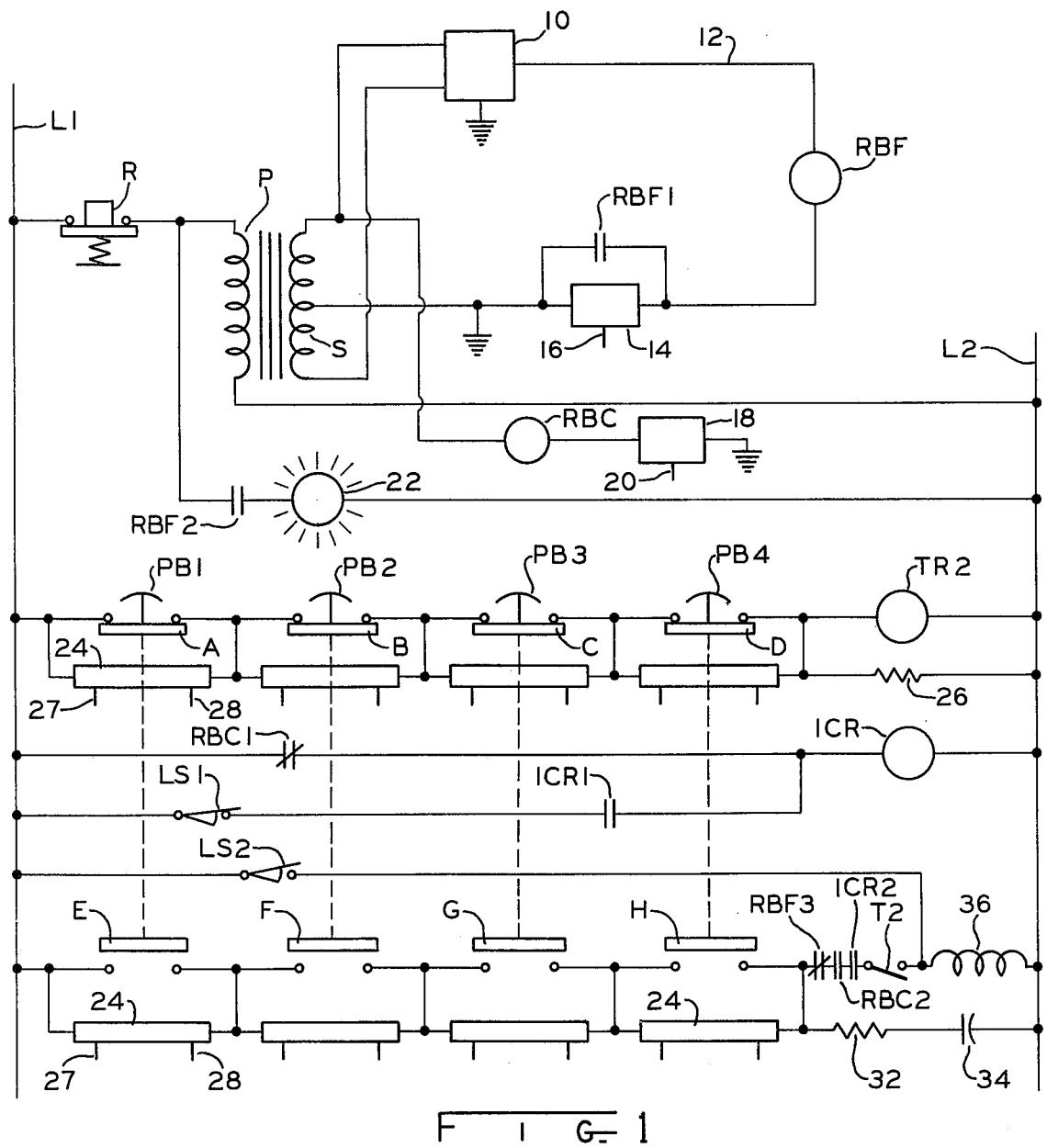
FIG. 1 is a schematic diagrammatic view of a press control circuit embodying monitoring devices according to the present invention.
Figure 1A:
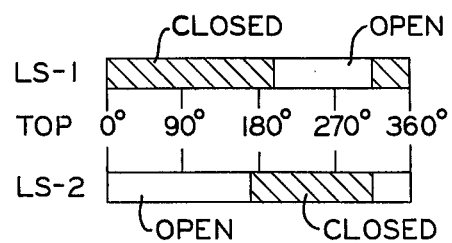
FIG. 1a illustrates the operation of the limit switches of FIG. 1.

Referring to the drawings somewhat more in detail, in FIG. 1, power lines marked L1 and L2 provide alternating current power for actuation of the various relays of the control system. The control system is devised for the control of a press and the press may, for example, include a main monitor including a motor driven flywheel which is rotatably mounted on one end of the crankshaft which has the throw connected with the press slide.

The crankshaft is adapted for being clutched to the flywheel by a supply of air to a clutch so the flywheel will drive the clutch in rotation while exhausting of the air in the clutch will permit springs to disengage the clutch and, instead, brake the crankshaft to the press frame.

The control arrangement of the present invention is particularly adapted for controlling the energization of valve solenoid means which control the supply of air to the aforementioned clutch arrangement.

Returning to FIG. 1, connection between power line L1 and L2 and in series with a normally closed pushbutton marked R is the primary P of a transformer having secondary coil S which is connected to a rectifier 10 which has an output wire 12 connected to one side of a fault relay coil marked RBF with the other side of the relay coil being connected through a circuit 14 to ground with circuit 14 being bypassed by normally open blade RBF1 under the control of relay RBF. Component 14, as will be seen hereinafter, is adapted to be tripped into conductive condition by a signal supplied thereto by wire 16 which leads to the aforementioned logic circuitry.

One end of secondary coil S is also connected to one side of another relay coil marked RBC, the other side of which is connected into another component 18 to ground with said other component going to conduction when a signal is supplied thereto by wire 20 which also leads to the aforementioned logic circuitry.

When relay RBF is energized, another blade RBF2 thereof closes and causes a signal light 22 to become illuminated. It will become apparent that when relay RBF is energized, there will be established a holding circuit through its blade RBF1 and de-energization of relay RBF will then be accomplished by opening reset pushbutton R. On the other hand, relay RBC will energize and deenergize in conformity with the signal on wire 20. It will also be seen that connected between L1 and L2 are the normally closed blades and a series of pushbuttons PB1, PB2, PB3 and PB4 and a timer TR2.

The pushbuttons have normally closed blades A, B, C and D and normally open blades E, F, G and H.

Each of the above-mentioned blades is paralleled by a respective monitoring circuit 24 with all of the monitoring circuits pertaining to the normally closed blades of the pushbuttons being connected in series across lines L1 and L2 with a current controlling resistor 26. Each circuit 24 has a pair of output lines 27, 28 which alternately change from high to low as the respective blade opens and closes.

The normally open blades of the pushbuttons are also paralleled by monitoring circuits 24, each having output lines 27 and 28 with the last-mentioned series of monitoring circuits connected in series with a resistor 32 and a capacitor 34 between power lines L1 and L2. These monitoring circuits monitor the voltage across the contact but otherwise have no effect on the operation of the button contacts in the press circuit.

A run relay 1CR has the coil thereof connected between power lines L1 and L2 in series with the normally closed blade RBC1 of run relay RBC. Bypassing blade RBC1 is a limit switch LS1 in series with blade 1CR1 of the aforementioned run relay 1CR.

As will be seen in the graph at the bottom of FIG. 1, switch LS1 is normally closed and opens for example at about 60° after the press slide connected to the crankshaft passes bottom dead center and stays open for about 40° to 50° of crankshaft relation and then closes again.

The normally open blades of the pushbuttons are connected in series with a normally closed blade RBF3 of relay RBF and a normally open blade RBC2 of run relay RBC, normally open blade T2 of timer TR2, and solenoid means 36. Solenoid means 36 pertains to the valves which control the supply of air to the press clutch. When coil 36 is energized, air will flow to the clutches and clutch the crankshaft to the flywheel and when solenoid means 36 is deenergized the air is exhausted from the clutch and the crankshaft is braked to the press frame.

The blades of the pushbuttons and the relay blades referred to above are all bypassed by a circuit containing a limit switch LS2 which is normally open and which closes just before the press slide reaches bottom dead center and opens at about 20° to 25° before the press slide reaches the top of its stroke.

In operation, when all of the pushbuttons PB1, PB2, PB3 and PB4 are depressed, if 1CR is energized and RBC is energized, solenoid means 36 will be energized and initiate movement of the press slide. About the time the press slide reaches the bottom of its stroke, the pushbuttons can be released and limit switch LS2 will maintain solenoid 36 energized. Shortly after limit switch LS2 closes, limit switch LS1 will open and deenergize run relay 1CR.

Thereafter, before the press comes to a halt, relay RBC will be deenergized, however, if the operator continues to hold the operator buttons depressed the RBC relay will remain energized and this will not allow the 1CR relay to re-energize since RBC1 will be open. All the buttons must be released before another cycle can be made. When limit switch LS2 then opens near the end of the movement of the press slide, solenoid means 36 will be deenergized and the press will stop after completion of cycle.

When a new cycle is to be initiated, depression of the pushbuttons will energize RBC and, if all of the pushbuttons are pressed while timer blade T2 is closed, solenoid means 36 will be energized and a further press cycle will be initiated. The RBC relay is therefore energized and deenergized once during each press cycle. The energized and deenergized states of this cycle or run relay as well as for the fault relay could, of course, be interchanged by appropriate minor circuit modifications.

Turning now to FIG. 2, which shows a typical monitoring or sensing circuit, it will be seen that the circuit generally indicated at 24 therein has input terminals 40 and 42 which are those terminals that are connected across the switch blade to be monitored. These terminals are connected through a rectifier unit 44 which supplies current to a further unit 46 having therein a light emitting diode 48 and a light sensitive transistor 50.

Transistor 50 has the connector-emitter path connected between a wire 52 at plus voltage and ground at 54 with resistor 56 interposed in the collector lead. The collector is also connected through a resistor 58 which is bypassed by a diode 60 connected from the collector to a point 62 which is connected through input capacitor 64 to ground point 54 and through resistor 66 to an amplifier 68, the output side of which is connected to one of the aforementioned output terminals 27 and through inverter 70 with the other of the output terminals at 28. It will be seen that whenever terminal 27 goes high output 28 will go low and vice versa.

All of the monitoring circuits illustrated in FIG. 1 are substantially the same as that shown in FIG. 2 and are not described in detail.

Figure 3:
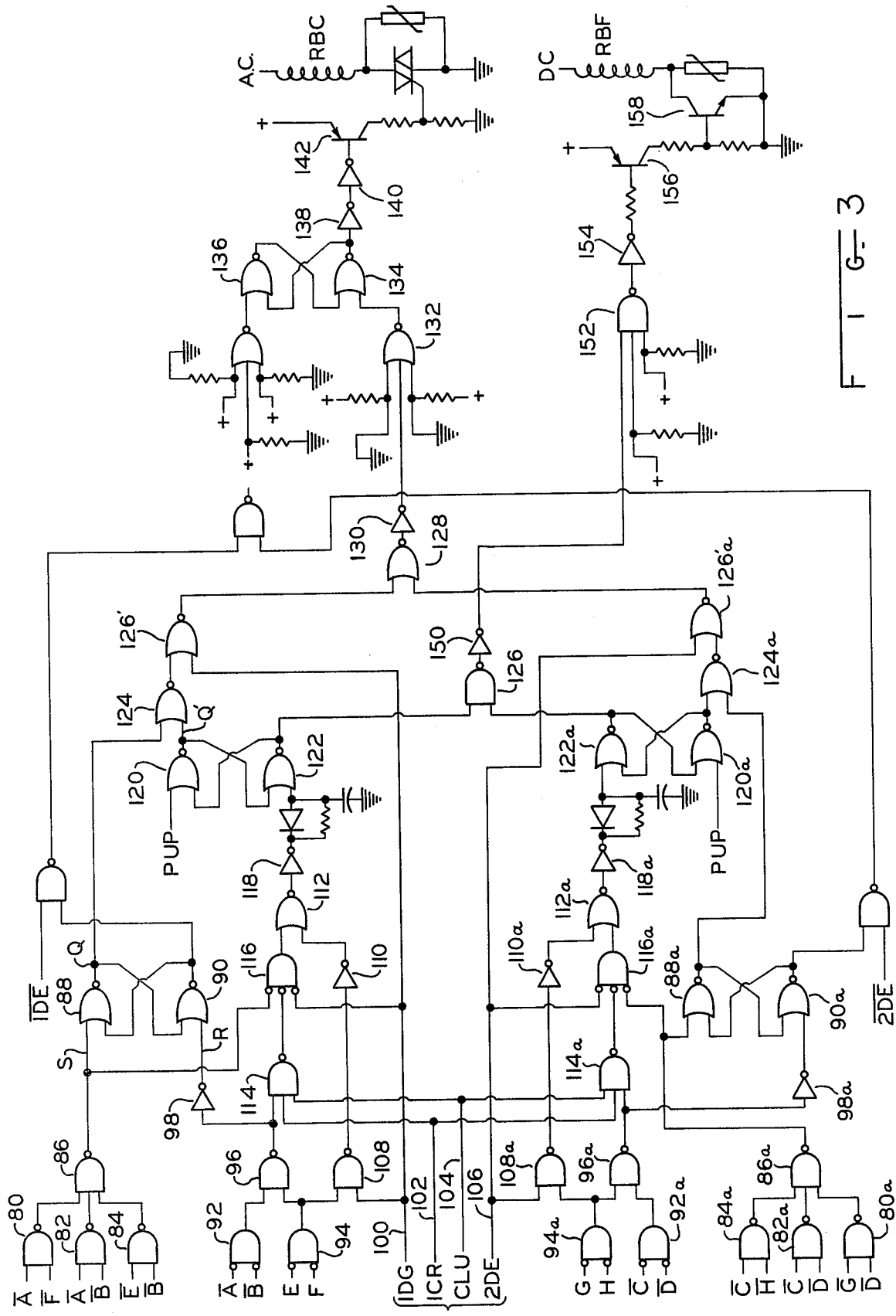
FIG. 3 is a schematic view of the logic circuitry which is interposed between the outputs of the monitoring circuits and a fault relay and a run relay.

FIG. 3 shows the logic circuitry by means of which relays RBF and RBC can be energized.

In order to simplify explanation of the logic circuit, the terminals 27 and 28 from the several monitoring circuits are marked with the letters A through H and $\bar{A}$ through $\bar{H}$. The barred terminals are those which go to logic high when the pertaining switch blade is separated from its contacts and those without the bar go to logic high when the pertaining switch blade closes on its contacts.

In FIG. 3, the first group of gates are in the form of NAND gates. These gates are shown at the upper left side with the inputs marked in conformity with the logic circuit output terminals to which they are connected. The outputs of the three NAND gates referred to, and which are identified by reference numerals 80, 82 and 84, form the inputs to a further NAND gate 86, the output of which is connected to one input of a set-reset NOR gate flip-flop made up of NOR gates 88 and 90.

A second set of gates at 92 and 94 are NOR gates with the inputs marked in the same manner as the first set of gates referred to and have the outputs connected to form the inputs to a NAND gate 96, the output of which is connected through inverter 98 to the reset input of the aforementioned NOR gate flip-flop.

Further inputs to the logic circuitry at 100, 102, 104 and 106 normally supply logic highs in the case of the first and last identified ones and logic lows in connection with the others thereof when circuit operation is proper.

The logic high on wire 100 forms one input to a NAND gate 108, the other input of which is connected to the output side of NOR gate 94. The output side of gate 108 is connected through inverter 110 to one of the inputs of a NOR gate 112.

The output from NAND gate 96 and wires 102 and 104 are connected to the inputs of a further NAND gate 114 having the output connected as one input to a NOR gate 116, the other inputs of which consist of the output of NAND gate 86 and wire 100.

The output of NOR gate 116 forms the second input to NOR gate 112, the output of which is connected by inverter 118 to one input of a NOR gate bistable multivibrator made up of NOR gates 120 and 122. The bistable referred to has one output connected as one input to a NOR gate 124 and another output connected as one input to a NAND gate 126.

The other input to NOR gate 124 is connected to the output side of gate 88 of the aforementioned flip-flop or bistable multivibrator.

Wire 100 and the output from gate 124 form the inputs to a still further NOR gate 126' having an output forming one input to a NOR gate 128, the output of which is connected through inverter 130 to one input of a NOR gate 132, the other inputs of which are normally held at ground potential. The output of NOR gate 132 forms one input to a flip-flop made up of NOR gates 134 and 136 and having an output connected via inverter 138 and a further inverter 140 to the base of a transistor 142 which will be triggered to conduction by a low signal supplied to inverter 138.

When transistor 142 conducts, run relay RBC will be energized.

At the bottom of FIG. 3, toward the left, is a group of NAND gates corresponding to the first described group of NAND gates at the top of FIG. 3 and having the inputs marked in the same manner. The circuitry on the lower side of FIG. 3 is the same as that on the upper side of FIG. 3 and the gates and the like are correspondingly numbered with the addition of a subscript $a$.

Each of the circuit portions, it will be noted, supply signals to NOR gate 128 and, similarly, supply signals to NAND gate 126.

The last-mentioned gate has the output connected via inverter 150 with one input of a NAND gate 152 having two other inputs which are normally held at logic high. The output of NAND gate 152 is connected through an inverter 154 with the base of a transistor 156 which, when made conductive by a low signal to the base thereof, will cause transistor 158 to go to conduction and effect energization of the coil of relay RBF. As mentioned before, once relay RBF is energized, it can only be deenergized by interrupting the supply of power to the circuit in which it is connected.

It will be evident that the fault relay will energize upon the development of a positive signal as an output from NAND gate 152 which will come about when the input thereto from inverter 150 goes low indicating that the output of NAND gate 126 is high and which comes about when either of the inputs thereof goes low.

With regard to the energization of RBC which occurs when transistor 142 conducts, this will occur when the input to inverter 138 goes low. The input to inverter 138 will go low when the output side of gate 134, which is normally high, goes low. The output of gate 134 will go low when the output from gate 132 goes high or to logic 1 and which will come about when the input line thereto from inverter 130 goes low which, in turn, occurs when the output from gate 128 goes high.

The output from gate 128 will go high when both of the inputs, and which are the outputs from gates 126' and 126'a, go to logic 0.

Since both of the gates 126' and 126'a operate in the same manner, only the functioning of gate 126' will be considered. This gate has one input held permanently low by the connection thereof to wire 100 while the other input is derived from the output of gate 124. The output of gate 126' will go high when the output of gate 124 goes low and which will occur when either input thereto is at high or logic 1.

The one input of gate 124 is connected to the output marked Q of the flip-flop made up of NOR gates 88 and 90 while the other input goes to the output marked Q' of the flip-flop made up of NOR gates 120 and 122.

In operation, if all of the blades of all of the pushbuttons cycle properly between open and closed positions during a press cycle, no fault signal will be developed and the fault relay will not be actuated.

However, if any of the normally closed blades fail to open when the switches are depressed or any of the normally open blades fail to open when the switches are released, or if a short circuit occurs between a normally closed blade and any normally open blade, a fault signal is developed which will trip the fault relay and shut down the entire system until the fault is corrected. Further, the cycle relay will be disabled also preventing press operation.

It is believed that the manner in which the system of the present invention can detect faults will be fully demonstrated by describing the fault condition arising in respect of pushbutton PB1 having the normally closed blade A and the normally open blade E.

The following schedule lists the conditions which obtain at the outputs of the monitoring systems for each of the blades of pushbuttons PB1 and PB2.

The outputs are identified at A, $\bar{A}$, B, $\bar{B}$, E, $\bar{E}$, and F, $\bar{F}$, and the logic values at the respective terminals are indicated in the chart with the first line of the chart showing proper switch conditions with the switches released and with the second line showing proper conditions of operation with the switches depressed.

The third and fourth lines show released and depressed conditions respectively and in which blade E of pushbutton PB1 is short circuited, namely, remains in engagement with the contacts pertaining thereto in both conditions of pushbutton PB1.

The third and fourth lines show the logic values of the terminals of the sensor units for released and depressed conditions respectively of the pushbuttons when blade A of pushbutton PB1 remains in engagement with the pertaining contacts while the pushbutton is actuated, namely, when blade A is short circuited.

| Button Position | SWITCHBLADE SENSOR OUTPUTS | | | | | | | |
|---|---|---|---|---|---|---|---|---|
| | A | $\bar{A}$ | B | $\bar{B}$ | E | $\bar{E}$ | F | $\bar{F}$ |
| Released | 1 | 0 | 1 | 0 | 0 | 1 | 0 | 1 |
| Depressed | 0 | 1 | 0 | 1 | 1 | 0 | 1 | 0 |
| E Shorted | | | | | | | | |
| Released | 1 | 0 | 1 | 0 | 1 | 0 | 0 | 1 |
| Depressed | 0 | 1 | 0 | 1 | 1 | 0 | 1 | 0 |
| A Shorted | | | | | | | | |
| Released | 1 | 0 | 1 | 0 | 0 | 1 | 0 | 1 |
| Depressed | 1 | 0 | 0 | 1 | 1 | 0 | 1 | 0 |

The group of gates indicated at 80, 82 and 84, will, when the pushbuttons are depressed, and the blades thereof move properly, supply a logic high to the S input of the flip-flop made up of NOR gates 88 and 90 and set the flip-flop so that it has a 0 at the Q output thereof.

Similarly, when the pushbuttons are released, if the blades move in a proper manner, a logic high will be supplied to the R input of the flip-flop made up of NOR gates 88 and 90 and reset the flip-flop so that the Q output thereof will go to 1.

It will be appreciated that the pushbuttons are depressed to initiate a cycle of the press and are then held in closed position to about bottom dead center of the motion of the press slide.

If, now, blade E, for example, is shorted, then, before the pushbuttons are depressed, the same signal will be supplied to the set terminal of the flip-flop referred to above but the output of gate 94 will now change so that a signal is transmitted through gates 114 and 116 to the flip-flop made up of NOR gates 120 and 122. This will change the logic level at the corresponding input of gate 126 thereby, as mentioned before, developing a fault signal which will trip the fault relay.

If, on the other hand, blade A of pushbutton PB1 is shorted, then when the pushbuttons are first depressed, a signal will be supplied through gates 86, 116 and 112 to the flip-flop made up of NOR gates 120 and 122 and will again supply a signal to NOR gate 126 which will trip the fault relay.

The other pushbuttons PB2 and PB3 are monitored in the same manner with the gating arrangement disclosed at the bottom of FIG. 3.

FIG. 3 shows sensing inputs from two operator stations. Leads 1DE and 2DE are used to disable one or the other monitoring circuit when one or the other operator station is not in use. A high signal on 1DE or 2DE will disable fault sensing on that channel. When line 102 or 1CR is high the sensing circuit is energized to sense. When line 104 or CLU is low the sensing circuit will be disabled. This arrangement is desirable for compatibility with certain other existing controls.

With regard to the cycle relay RBC, this relay will drop out due to the signal from the flip-flop made up of NOR gates 88 and 90. This flip-flop, and the corresponding flip-flop made up of NOR gates 88a and 90a will operate, if no fault signal has been developed, to first release run relay RBC and then re-energize relay RBC when the next cycle is started.

Modifications may be made within the scope of the appended claims.

What is claimed is:

1. In an electric control system for a machine having a plurality of pushbutton actuated switch blades, depression of said pushbuttons from a released position causing the machine to cycle; a plurality of monitoring circuits each connected in parallel with a switch blade and each monitoring circuit having a pair of output terminals at respective logic voltages and which alternate between high and low levels as the respective switch blade opens and closes, a relay controllable for interrupting operation of said machine, logic circuitry having inputs connected to said output terminals of said monitoring circuits and having an output at which a fault signal appears upon malfunction of any of said switch blades, and circuit means connecting said output of said logic circuitry to said relay for control of the relay when a fault signal is developed at said output terminal.

2. An electric control system according to claim 1 in which said circuit means comprises a source of voltage, a transistor in said circuit means having the base terminal connected to said output terminal of said logic circuitry and sensitive to a fault signal supplied thereto from said output terminal to cause said source of voltage to supply energizing current to said fault relay.

3. An electric control system according to claim 2 which includes a holding circuit for said fault relay having a blade of the fault relay and a normally closed switch therein.

4. An electric control system according to claim 1 in which said logic circuitry comprises first sensing means sensitive to the bridging or failure by short circuit between a normally closed blade and any normally open blade to develop a fault signal at the output of said logic circuitry.

5. An electric control system according to claim 1 in which said logic circuitry comprises second sensing means sensitive to the failure of any normally closed switch blade to open to develop a fault signal at the output of said logic circuitry.

6. An electric control system according to claim 1 in which each monitoring circuit comprises an input terminal connected to each switch contact which is controlled by the respective switch blade, a source of light connected to said input terminals which is illuminated when the switch blade is open, and transistorized circuitry connected to said output terminals and sensitive to light from said source of light for developing logic voltage on said output terminals of said monitoring circuit.

7. An electric control system according to claim 1 in which each monitoring circuit has a pair of input terminals connected in parallel with the contacts controlled by the blade being monitored so that the voltage across the input terminals is high when the blade is open and low when the blade is closed, a rectifier connected to said input terminals and a light source connected to said rectifier, a transistor having a light sensitive base terminal adjacent said light source, a source of voltage connected to one end of the collector-emitter path of the transistor and the other end of said path being connected to ground, a resistor in series with said path of one of said output terminals being connected to a point along said resistor which varies in voltage between the conductive and nonconductive states of said transistor, and an inverter connecting the other of said output terminals to said point.

8. An electric control system according to claim 7 in which the switch blades include a set of normally closed blades and a set of normally open blades, a monitoring circuit connected across the switch contacts controlled by each blade, the monitoring circuits across each said set of blades being connected in series.

9. An electric control system according to claim 8 in which said normally closed blades are serially connected and said normally open blades are also serially connected.

10. An electric control system according to claim 1 in which said relay must energize and deenergize with each press cycle and will latch in one position should a fault occur.

11. An electric control system according to claim 1 in which said relay is a normally deenergized fault relay energizable for interrupting operation of said machine upon receipt of said fault signal.

12. An electric control circuit for a machine having a plurality of pushbutton actuated switch blades, depression of said pushbuttons from a released position causing the machine to cycle, the control circuit including a plurality of monitoring circuits, each connected in parallel with a switch blade and each monitoring circuit having a pair of output terminals at respective logic voltages and which alternate between high and low levels as the respective switch blade opens and closes, the monitoring circuit including circuit components in parallel with the monitored switch blade, such that the sensing current is insufficient to constitute an operating current to energize the machine.

* * * * *